United States Patent [19]
Dexter

[11] 3,922,415
[45] Nov. 25, 1975

[54] PROCESS OF TIRE RECAPPING AND CUSHION THEREFOR

[75] Inventor: Warren L. Dexter, Orinda, Calif.

[73] Assignee: Electra-Bond, Inc., Livermore, Calif.

[22] Filed: Aug. 22, 1973

[21] Appl. No.: 390,388

[52] U.S. Cl. .................. 428/133; 152/360; 156/96; 156/124; 156/394; 156/128; 156/129; 156/275; 264/25; 264/27; 264/277; 264/315; 264/326; 425/41; 428/177; 428/295

[51] Int. Cl.² .................. B29H 5/04; B29H 17/36

[58] Field of Search ............ 156/124, 96, 275, 394, 156/128, 129; 425/41; 264/25, 27, 277, 315, 326; 152/360, 361 R; 161/86, 95, 111, 161/144, 149

[56] References Cited
UNITED STATES PATENTS

| | | | |
|---|---|---|---|
| 1,339,736 | 5/1920 | Burke | 156/275 X |
| 2,662,045 | 12/1953 | Baggott | 156/275 X |
| 2,774,409 | 12/1956 | Skidmore | 156/96 |
| 3,348,640 | 10/1967 | Thompson | 156/275 X |
| 3,429,005 | 2/1969 | MacMillan | 425/41 X |
| 3,779,830 | 12/1973 | Reppel | 156/96 |

FOREIGN PATENTS OR APPLICATIONS 117,696  11/1946  Sweden .................. 156/275

Primary Examiner—Clifton B. Cosby
Attorney, Agent, or Firm—Richards, Harris & Medlock

[57] ABSTRACT

Method and apparatus for retreading tires with electrical resistance wires for heating the rubber to vulcanize same including the attachment of wires between thin base strips with a rubber cushion disposed beneath a new tread element to be attached to the carcass. The base strips are configured to limit heat flow from the wires thereto. New tread is held in place by a split restraining hoop having side flanges directed to engage the base strips and electrical energization of the wires is made through connectors to opposite sides of the hoop. After vulcanizing by electrically generated heat the base strips are stripped from the then embedded wires.

A process of manufacture comprising heating wires extending transversely between thin electrically conducting base strips with a rubber cushion covering the wires and limited attachment to the base strips with the base strips being separable from substantially all of the wire length after use of the product in a vulcanizing process.

11 Claims, 10 Drawing Figures

PROCESS OF TIRE RECAPPING AND CUSHION THEREFOR

BACKGROUND OF THE INVENTION

It is known in the recapping of tires for vehicles to employ electrical heating wires for vulcanizing new tread onto a tire casing or carcass. Such a method is, for example, disclosed in the early U.S. Pat. No. 1,216,654 issued in 1917, and subsequent improvements therein are reflected in later U.S. Pat. Nos. 1,422,537 and 1,690,615 by the same inventor.

The generation of heat by electrically energized wires disposed upon a tire casing for the purpose of recapping a tire raises the exciting possibility of tire recapping without requiring molds and other complicated equipment. Additionally such a process could possibly be performed in the field so that very large tires, for example, such as employed on off-road vehicles would not have to be physically transported to and from recapping facilities.

Various difficulties have been encountered in the practical application of the general principle enunciated in the foregoing patents. Bonding of new tread to an old casing requires the application of heat and pressure and difficulties have been encountered in the proper application of such pressure. Futhermore, and probably most important, has been the difficulty of properly and uniformly applying the heat through the resistance wires. Overheating of the wire ends causes sparking, burn-out of wires, and ignition of the rubber being operated upon, while conduction of heat from the wires to electrical buses or the like causes uneven application of heat to the rubber to be bonded.

The present invention provides method and apparatus for overcoming the foregoing difficulties so as to materially simplify the recapping process while producing an improved product.

SUMMARY OF INVENTION

The method of the present invention provides for the application upon a tire casing or carcass of a strip or cushion including rubber and electrical heating wires with new tread being disposed atop the cushion about the casing. The cushion is formed with electrically conducting base strips along opposite edges thereof with heating wires connected between such strips. The base strips are formed with limited areas extending into the material to be heated for limiting the flow of heat from such material so that a relatively uniform bonding temperature is attained. A collapsible rim is disposed within the tire casing and an inflatable tube located about this rim. A split restraining hoop is disposed about the new tread and casing and tightened thereon so that subsequent inflation of the tube exerts requisite pressure between casing and new tread. The restraining hoop is longitudinally split into two halves and each of these halves, formed of electrically conducting material, engages the base strips of the cushion to form a good electrical connection thereto. Electrical power is applied between the two halves of the restraining hoop to thus pass current through the heating wires to heat the rubber of the cushion for bonding the new tread to the tire casing by heat and pressure. The temperature to which the cushion is raised is monitored and electrical current passed through the heating wires is controlled thereby so as to attain and maintain for a desired period of time the appropriate heat for bonding the new tread to the casing.

The present invention provides an improved cushion or element that is highly advantageous for resistance heating to bond new tread to a tire casing. This cushion includes a plurality of electrical heating wires connected between base strips of electrically conducting metal with a layer of rubber above and below the wires extending over the connection of wires and base strips. The base strips are formed in such a manner so to limit heat conduction to the strip from the heating wires and to readily part from the heating wires, or at least the substantial length thereof, following recapping. This connection may be accomplished by providing cutouts along the base strip extending into the cushion of rubber and attaching the wires to the inner edges of the base strip as by welding. Alternatively the connection may be formed by providing lateral tabs on the base strips and crimping these about the ends of the wires.

DESCRIPTION OF FIGURES

The present invention is illustrated as to particular preferred embodiments thereof in the accompanying drawings wherein.

DESCRIPTION OF PREFERRED EMBODIMENTS

Figure 1:
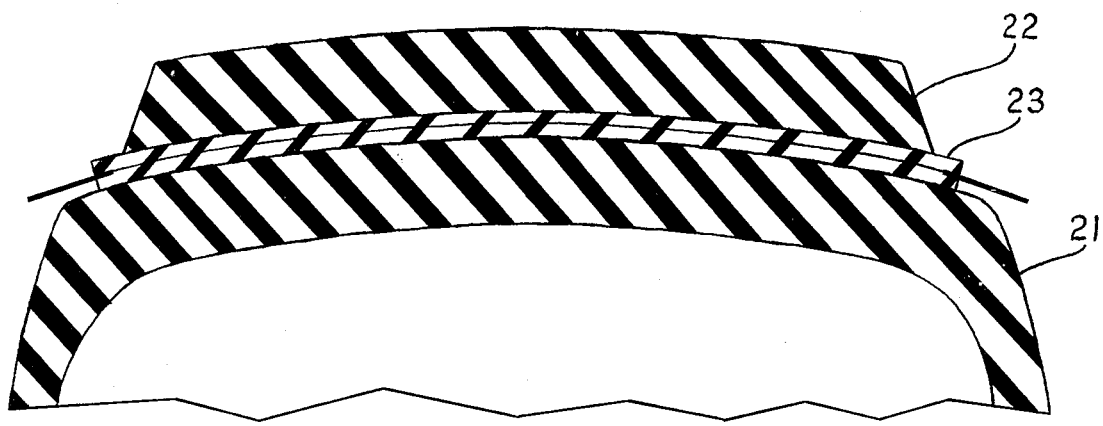
FIG. 1 is a transverse sectional view through the outer part of a tire casing having the cushion of the present invention disposed thereon and new tread disposed atop the cushion about the casing.

There is illustrated in FIG. 1 of the drawing part of a tire casing 21 to be recapped and having a new tread element 22 disposed thereabout with a vulcanizing cushion 23 between the casing and tread. It will be appreciated that the tire casing is originally buffed to provide a relatively circular rough outer surface for attachment of new tread to the casing. The lateral extent of the cushion 23 will be seen to be a slightly greater than the width of the new tread 22 for reasons described below. In FIG. 1 the tire carcass is crosshatched to illustrate rubber; however, it will be appreciated that such carcass normally incorporates fabric or metal cords, belts and the like, in accordance with conventional tire manufacture.

Figure 2:
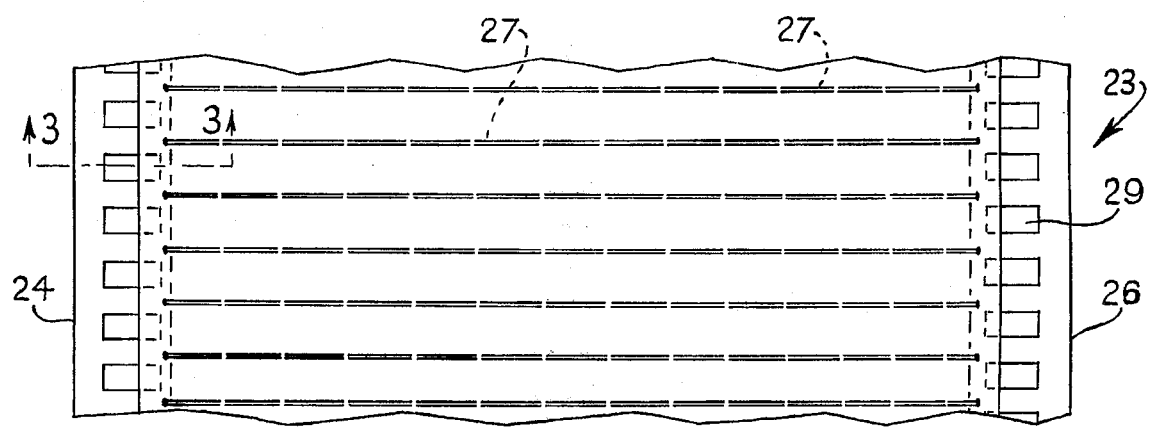
FIG. 2 is a partial plan view of a vulcanizing cushion in accordance with the present invention.
Figure 3:
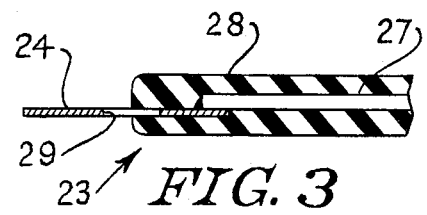
FIG. 3 is a partial sectional view taken in the plane 3—3 of FIG. 2.

The present invention provides a novel and highly advantageous cushion or bonding strip in the process hereof and in this respect reference is made to FIGS. 2 and 3 illustrating such a strip. The cushion 23 includes a pair of parallel spaced electrically conducting base strips 24 and 26. These strips are preferably formed of brass plates steel having a thickness of the order of 0.008 inches. Electrical heating wires 27 are connected between the base strips 24 and 26 and such wires are preferably formed of brass plates steel with a diameter, for example, of 0.010 inches. There are a variety of different ways of attaching the heating wires to the strips and in FIGS. 2 and 3 such attachment is accomplished by spot welding the ends of the wires onto the interior edges of the strips, as illustrated. The cushion 23 also includes a layer of rubber 28 disposed about the heating wires 27 and extending over the inner edges of the strips including the connection of wires to strips.

The base strips 24 and 26 of the cushion are formed with longitudinally spaced and aligned cutouts or openings 29 therethrough. These cutouts may be rectangular with the dimension, for example, of 3/16ths inch by 3/8ths inch, and are disposed in spaced relation along the length of each of the strips with the wires 27 being connected to the strips between the cutouts. The base strips 24 and 26 provide electrical connections or bus connectors for the resistance wires 27. These resistance wires are completely embedded in the rubber layer 28 with no exposure to the atmosphere. This is quite important to prevent overheating of the wires in the air and consequent sparking and burning of rubber along the edges thereof. It is particularly noted that the cutouts 29 extend outside the rubber layer 28. The base strips 24 and 26 thus only provide narrow fingers extending to the heating wires so that quite small metal volumes are provided for heat flow from the cushion. The heat from the wires 27 is thus mainly confined to the bonding area so that it is possible to maintain the bonding temperature relatively uniform over the entire cushion area. This is quite important in achieving a good bond between tire casing and new treads.

Figure 5:
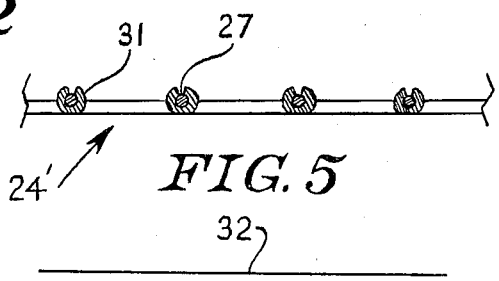
FIG. 5 is a sectional view taken in the plane 5—5 of FIG. 4.
Figure 4:
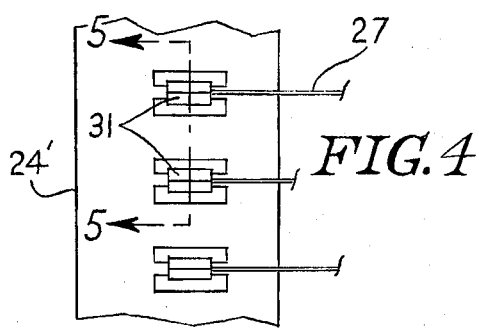
FIG. 4 is a partial plan view of an alternative base strip and heater wire connection.

In the embodiment of the present invention illustrated in FIGS. 2 and 3, the heating wires 27 are shown to be secured to the base strips as by welding and an alternative attachment is illustrated in FIGS. 4 and 5. As shown in FIG. 4, a base strip 24' has tabs 31 cut loose around the edges thereof and turned upwardly in pairs toward each other for crimping about heating wires 27. In this manner the material of the cutouts 29 is, in fact, employed for attachment of the wires to the strip by leaving the center of the material connected to the remainder of the strip and bending the edges up as the tabs 31, as clearly shown in FIG. 5. This type of attachment, as well as welded attachment, may be readily accomplished by automated equipment. The edge of the rubber layer extends along the middle or near middle of the tabs 31 so as to achieve similar limited heat conduction to the strips as described above.

The present invention provides for the removal of the base strips or conductors 24 and 26 from the heater wires after the cushion has been employed in bonding tread to a tire casing. Once the cushion has been bonded to and between the tire casing and tread, the rubber of the cushion will be fused to the casing and tread and the wires 27 are firmly embedded therein. It is noted in this respect that the material of the wires as well as the material of the strips should be compatible with rubber, i.e., should not upon heating cause deterioration of the rubber. This may be accomplished by flash brass plating of the wires and strips, for it is known in the art that brass and rubber are compatible. Removal of the base strips 24 and 26 after the tread is attached to the tire, is accomplished by pulling the strips radially outward of the tire about the circumference thereof. This causes the wire ends to be sheared off or broken off by the inner edges of the strips. Actually the operations is somewhat like a cutting operation and it is quite simple to merely grip a strip and tear it loose by pulling radially outward on a strip while moving about the circumference of the tire. This then breaks off the ends of the wires within the cushion so that the finished product exhibits no wire ends nor metal elements extending exteriorly of the tire.

Figure 6:
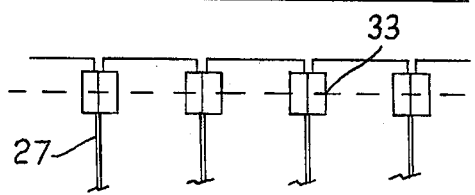
FIG. 6 is a partial plan view of yet another embodiment of base strip and heater wire connection.

A further alternative manner of connecting the heater wires 27 to the base strips or conductors 24 and 26 is illustrated in FIG. 6. There is shown in FIG. 6 a base strip 32 formed with tabs 33 extending laterally therefrom on the inner edge of the strip. These taps are evenly spaced along the inner edge of the strip and heater wires 27 are attached to the strip by crimping over these tabs to thus grip the ends of the wires. Although this attachment may seem to be the same as that of FIG. 4, it is noted that removal of the strip 32 from the wires involves a different mechanism. In this type of attachment the wire ends are not sheared off but, instead, the strip is removed from the wires by pulling the strip and tabs off of the ends of the wires. Care is to be taken in crimping of the tabs over the wire ends to ensure first a good electrical and mechanical connection and, secondly, to provide the same gripping of each wire end so that the strip may be readily removed after the cushion has been employed in the recapping operation. This also can be readily accomplished by automated crimping equipment.

Figure 8:
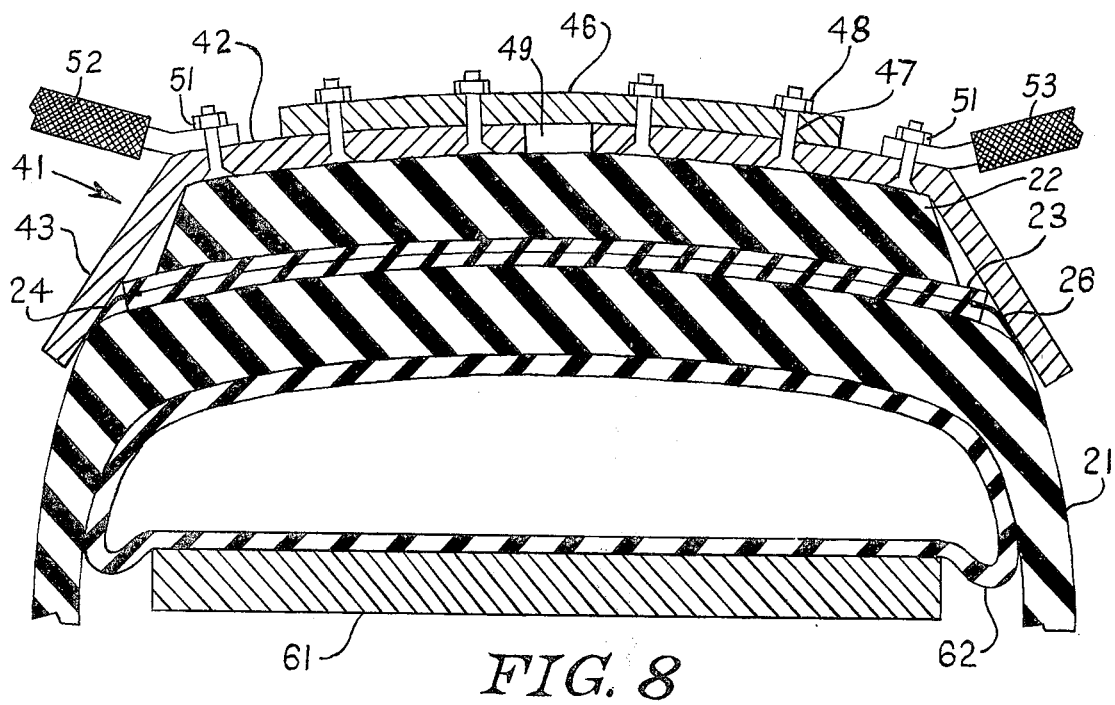
FIG. 8 is a transverse sectional view taken in the plane 8—8 of FIG. 7 and indicating the relationship of elements at the time of vulcanizing new tread upon a tire casing in accordance with the present invention.
Figure 7:
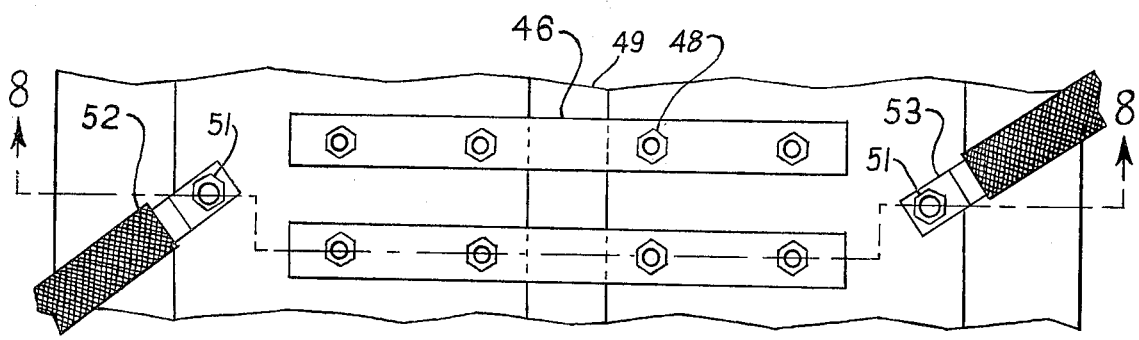
FIG. 7 is a partial plan view of a restraining hoop in accordance with the present invention and disposed upon a tire casing.
Figure 9:
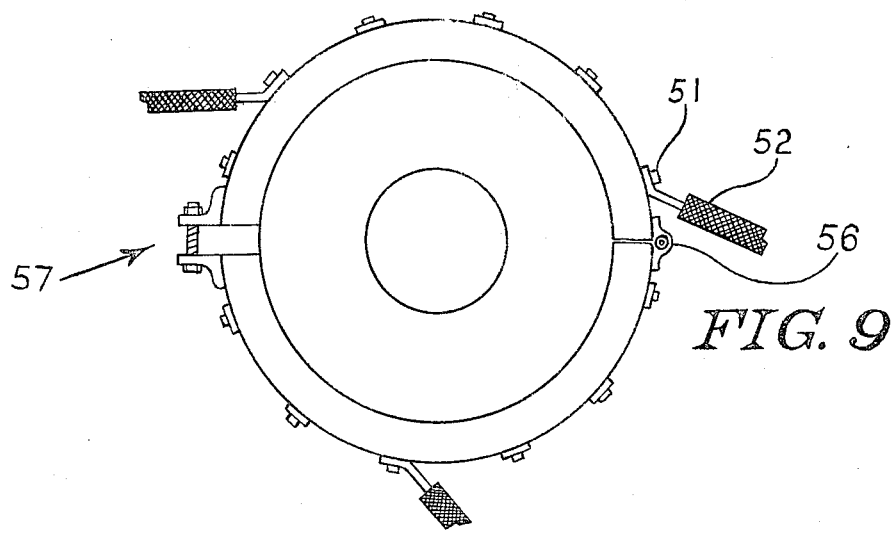
FIG. 9 is a side elevational view of the tire casing with the restraining hoop of the present invention secured thereabout.

Considering further the process of tire recapping in accordance with the present invention, reference is made to FIGS. 7, 8 and 9. Following appropriate preparations of a tire casing 21, as by buffing the outer periphery thereof to a desired diameter and surface condition, the cushion 23 of the present invention is wrapped about the periphery of the tire. The new tread 22 is then wrapped about the tire over the cushion and it is noted that the lateral width of the cushion is slightly greater than that of the tread. It is also noted that the separation of the base strips 24 and 26 of the cushion is slightly greater than the width of the new tread. Of course different sized cushions are employed with different sized casings and treads; however, the foregoing relationships are important to ensure complete and uniform bonding of tread to casing. Also it is important that the base strips not be disposed between tread and casing because strip removal would then separate the bond along the edges of the tread. The base strips or conductors 24 and 26 extend laterally from the cushion about the periphery of the tire and the tread and cushion are retained upon the tire casing by means of a split restraining hoop 41. The hoop is formed of two halves that are mirror images of each other with each half including an annular outer portion 42 and laterally inclined flange 43. The total hoop width is substantially equal to the tread width and the hoop flanges extend outwardly from the hoop edges and are inclined radially inward at such an angle as to engage the tire casing about same on both sides of the tread. The restraining hoop 41 is made of metal and will be seen to bear upon the cushion base strips 24 and 26 about the hoop flanges. The inner surface of the hoop flanges 43, at least along the lower portion thereof, may be plated for improved electrical contact with the base or conductor strips 24 and 26.

The hoop 41 has the two halves thereof connected together by insulating bars 46 with bolts 47 extending through the hoop halves and insulating bars with nuts 48 tightened on the outer end of these bolts to secure the insulating bars to the hoop. These insulating bars 46 maintain the two halves of the hoop in spaced relationship.

It will be seen from FIGS. 7 and 8 that the halves of the restraining hoop are spaced apart by the insulating bars to define a slot 49 between the halves of the hoop about the periphery of the tire. Thus, the halves of the hoop are electrically insulated from each other and there are provided lugs 51 on each of the halves of the hoop for attachment of electrical conductors 52 and 53. A number of each of these conductors may be positioned about the circumference of the hoop halves and the conductors are adapted to be connected to a controlled electrical power source to supply heating current during retreading operations in accordance with this invention. It will be seen that the electrical conductors connected to the halves of the hoop are thus connected through the hoop flanges 43 to the base strips 24 and 26 of the cushion.

The restraining hoop 41 is adapted to be tightly clamped about the tire casing and tread thereon and to this end it may be hinged as indicated at 56 and be provided with tightening means 57 for drawing the restraining hoop tightly about the tread and casing. Within the casing there is provided a conventional, collapsible rim 61 with an inflatable tube 62 disposed thereabout between the rim and the tire casing, as shown in FIG. 8. The collapsible rim 61 is rigid when extended and thus inflation of the tube 62 exerts a force outwardly on the tire casing to thus compress the casing and tread together against the cushion between the tube and restraining hoop. In this manner it is possible to apply desired bonding pressure with heat for bonding being provided by the energization of the heating wires in the cushion. It will be appreciated that different sized collapsible rims are employed for different sized tires and similarly the size of the restraining hoop is made commensurate with the particular tire with which it is to be employed. Naturally the width and length of the cushion 23 of the present invention is also predetermined so that the cushion extends entirely about the circumference of the carcass or tire casing and also the cushion extends slightly outwardly from the new tread, as illustrated particularly in FIG. 1.

Figure 10:
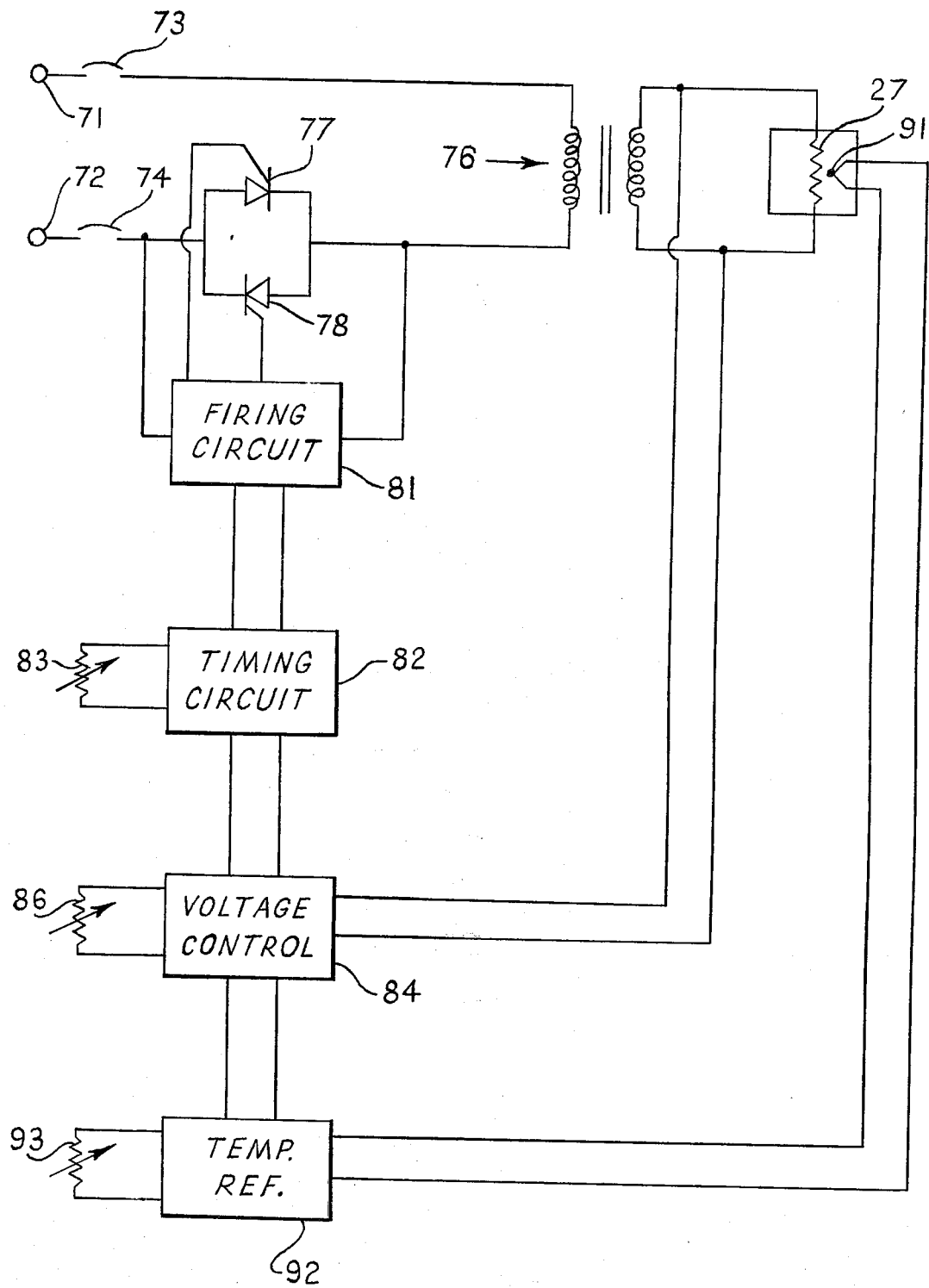
FIG. 10 is a schematic electrical diagram of circuitry for energizing the heating wires of the present invention.

Energization of the heating wires of the cushion thereof may be accomplished by means of a circuit such as illustrated in FIG. 10. Referring now to FIG. 10, there will be seen to be provided power supply terminals 71 and 72 adapted for connection to a source of alternating current electrical energy such as a motor-driven generator or the like. The terminals 71 and 72 are connected through circuit breakers 73 and 74, respectively, across the primary of a step-down transformer 76 with control over energization of the transformer being provided by a pair of silicon controlled rectifiers 77 and 78 connected in opposed parallel relationship between power supply terminal 72 and transformer 76. The secondary of the transformer 76 is connected across heating wires schematically illustrated by the single wire 27 of FIG. 10. Control over energization of the heater wires is provided by a firing circuit 81 connected across the SCRs and having output lines connected to the control means of these SCRs. A time quanti method of control is herein employed to control the point in each half cycle of electrical energization at which time SCR fires. It will be appreciated that the SCRs continue conduction for the completion of alternate half cycles of ac voltage after firing and thus controlling the point of phase of initiation of conduction controls the quantum of energy passed during each cycle.

The firing circuit is controlled by a timing circuit 82 having adjusting means 82 to set the total curing or bonding time. The firing circuit is connected to a voltage control circuit 84 having input lines connected across the secondary of the transformer 76 and also having control means 86 to set the SCR gate voltage for establishing the heating rate of the rubber. In order to obtain and maintain a desired temperature for bonding tread to tire casing, there is provided a temperature sensor such as a thermocouple or the like 91 in the cushion 23. The temperature sensor is disposed between wires of the cushion within the rubber layer 28 with insulated leads extending out of the side of the cushion and connected to a temperature reference circuit 92 having control means 93. The temperature reference 92 is also connected to the firing circuit 81 and compares the actual temperature as measured by the temperature sensor 91 to a desired temperature for producing an output signal indicating the amount of temperature variation from the desired bonding temperature of the cushion. In practice the bonding or curing temperature is maintained at about 293° F. with a curing time of about 15 minutes and the temperature reference signal may be employed to reduce the heating rate to thus maintain the desired bonding temperature. The pressure exerted between the tire casing and new tread is maintained at about 85 pounds per square inch. It has been found that with these operating conditions a highly satisfactory bond is obtained between tire casing and tread so that a superior recapping process is achieved.

Following attachment or bonding of new tread to a tire casing, the restraining hoop is removed from the casing as is the collapsible rim and inflatable tube. The base strips or conductors 24 and 26 are then separated from the recapped tire by gripping the strips and pulling them radially of the tire and about the circumference thereof. With the attachment of wires 27 to the strips in the manner illustrated in FIGS. 3 or 4, this shears or severs the ends of the wires at the inner edge of the strips. It will be appreciated that this shear line is disposed within the cushion but exteriorly of the new tread, as illustrated in FIG. 1. In the case of wire and strip attachment in the manner illustrated in FIG. 6, removal of the strips is accomplished by pulling the strips from the wires to part the connections of the tabs 33 to the wires, also within the cushion and outside of the tread.

There has been described above an improved process and apparatus for recapping tires, together with an improved and highly advantageous cushion structure for utilization in such a process. It will be noted that the process of this invention proceeds generally in line with the teachings of the prior art; however, with certain important variations. The particular location and manner of energization of heating wires in accordance with this invention overcomes numerous prior art problems including those of overheating, sparking and fires associated with this general type of recapping. Additionally the invention provides for relatively uniform heating of the cushion and contacting tread and casing so as to achieve superior bonding of tread to casing. It will be seen that the process of this invention does not require the use of a mold nor of heavy expensive equipment. Consequently the process hereof is adapted for use in the field so that tires need not be transported to a recapping center or facility but, instead, may be recapped at the location of the vehicle upon which the tires are mounted. When the physical size of vehicle tires is considered such as, for example, 8 and 10 foot diameter off-road vehicle tires, it will be readily appreciated that the advantage of recapping such tires without the necessity of transporting them is highly advantageous.

The above-described manner of securing together the tire casing, cushion and new tread for tire recapping and the manner of electrically connecting the heating wires of the cushion to a power source is also highly advantageous. By engaging the base strips 24 and 26 of the cushion with the restraining hoop flanges about the entire circumference of the tire on both sides of the tread, the present invention precludes the possibility of failure to energize any of the heating wires and this is, of course, quite significant inasmuch as any local temperature variation during recapping is highly deleterious to the resultant bond obtained.

There is furthermore provided by the improved cushion of the present invention a major advancement in tire recapping. The continuous base strips or conductors provide for the same energization of each heating wire and the location of the wire ends within the rubber layer of the cushion precludes the possibility of overheating of the wire ends. The reduced base strip areas entering the remainder of the cushion limit heat conduction out of the rubber layer so that a relatively uniform bonding temperature is achieved and maintained. It is furthermore noted that the particular cushion of the present invention is furthermore advantageous in providing for easy removal of the base strips to leave only the edges of the rubber layer of the cushion exposed following recapping. This not only improves the appearance of the recapped tire but, furthermore, improves the quality of recapping.

The present invention has been described above in connection with particular preferred embodiments thereof and steps in the process of the invention; however, it will be appreciated by those skilled in the art that variations are possible within the true spirit of the invention. It is not intended to limit the invention to the precise terms of description nor details of illustration.

What is claim is:

1. A method of recapping tires comprising the steps of:
    attaching heating wires electrically in parallel connection between a pair of substantially parallel conducting base strips with a vulcanizable rubber layer covering the wires and part of the strips and forming a large plurality of cut-outs in the strips along the edge of said rubber layer to provide a substantially reduced area of strips at the cut-outs with the layer covering a part of the cut-outs to form a cushion element,
    wrapping said cushion about a prepared tire casing,
    securing new tire tread about said casing over said cushion,
    applying pressure between said tread and casing, and
    passing a heating current through said heating wires by connecting a power supply across said base strips to bond the tread to the casing with the cushion therebetween.

2. The method of claim 1 further defined by the step of removing said base strips after recapping by pulling said strips radially outward of the tire casing progressively about the circumference of the case from one end of each strip.

3. The method of claim 1 further defined by forming said cushion with the distance between inner edges of said base strips being slightly greater than the width of the new tread and disposing said cushion and tread in alignment with the inner strip edges slightly laterally displaced outwardly from the sides of the new tread.

4. The method of claim 1 further defined by mounting said new tread upon said tire casing by a circumferentially split retaining hoop tightened about the new tread and being formed of electrically conducting material with separate halves thereof engaging separate base strips about the tire casing for electrical connection thereto.

5. The method of claim 1 further defined by passing a heating current through said heating wires by connecting a low voltage alternating current ot said base strips and controlling the amount of heating by controlling the portion of each half cycle of current applied to the wires in accordance with the temperature of the cushion rubber during bonding of tread to casing.

6. An improved cushion element for use in recapping of tires by electrical heating comprising:
    a pair of substantially parallel thin electrically conducting base strips,
    a plurality of heating wires extending directly between said strips and electrically connected in parallel between said strips,
    a vulcanizable rubber layer encompassing said wires and the inner edges of said base strips,
    said base strips having portions removed therefrom along the edges of the rubber layer to extend only tabs of substantially reduced width material into the rubber so as to limit heat conduction from the heating wires connected thereto out of the rubber to the outside portions of the strips whereby a substantially even heating by said wires results from passing an electrical current therethrough.

7. The cushion element of claim 6 further defined by each of said strips having cut-out portions aligned along the length thereof and spaced from the lateral edges in position to have the edges of said rubber layer extend along the strips across the cut-out portions.

8. The cushion element of claim 7 further defined by said wires being welded to said strips along the inner edges thereof whereby the wire ends are severable from the wires by tearing of the base strips from the cushion after the cushion has been employed for recapping.

9. The cushion element of claim 7 further defined by at least a part of the material of said cut outs remaining integral with the strips and being crimped over wire ends to secure the wires to the strips.

10. The cushion element of claim 6 further defined by the inner edges of said strips being formed as a plurality of laterally projecting tabs partially undercut on each side at the bases thereof and folded over wire ends to grip the wire ends and secure the wires to the strips with the edges of the rubber extending across the tabs outwardly of the wire ends whereby said strips may be separated from said wires by pulling the strips and tabs from the wire ends after the cushion has been embedded in a recapped tire.

11. Tire recapping apparatus for use with a cushion element having electrically conducting base strips extending along opposite sides of a rubber layer with heating wires disposed in the rubber between the strips comprising:
 a split retaining hoop of electrically conducting material having two annular halves with insulating bars secured thereto and spacing the halves apart, said hood halves each having circumferential flanges thereabout extending radially inward for engaging the base strips of a cushion disposed between a tire casing and new tread about which the hoop is adapted to be disposed,
 electrical connectors on each hool half for connection to an electrical power supply to energize the cushion heating wires, and
 means disposable within a tire casing for applying a radially outward pressure to the casing having new tread retained thereabout by said restraining hoop for bonding of tread to casing by heat and pressure.

* * * * *